United States Patent
Lobo Barros et al.

(10) Patent No.: US 8,177,169 B2
(45) Date of Patent: May 15, 2012

(54) INTEGRATIVE STRUCTURE FOR AIRCRAFT FAIRING

(75) Inventors: Abel Lobo Barros, Madrid (ES); Jose Luis Lozano Garcia, Getafe (ES)

(73) Assignee: Airbus Operations S.L., Getafe (ES)

( * ) Notice: Subject to any disclaimer, the term of this patent is extended or adjusted under 35 U.S.C. 154(b) by 311 days.

(21) Appl. No.: 12/478,311

(22) Filed: Jun. 4, 2009

(65) Prior Publication Data

US 2010/0243810 A1 Sep. 30, 2010

(30) Foreign Application Priority Data

Mar. 30, 2009 (ES) .................................. 200900851

(51) Int. Cl.
*B64C 1/00* (2006.01)
(52) U.S. Cl. ...................................................... 244/131
(58) Field of Classification Search .................. 244/131, 244/119, 121, 123.11, 123.5
See application file for complete search history.

(56) References Cited

U.S. PATENT DOCUMENTS

| | | | | |
|---|---|---|---|---|
| 4,390,153 A * | 6/1983 | Wuermseer | .................... | 244/131 |
| 4,556,591 A * | 12/1985 | Bannink, Jr. | .................... | 428/43 |
| 6,092,764 A * | 7/2000 | Geders et al. | .............. | 244/117 R |
| 6,655,635 B2 * | 12/2003 | Maury et al. | .................... | 244/131 |
| 7,625,623 B2 * | 12/2009 | Grose et al. | .................... | 428/119 |
| 7,770,846 B2 * | 8/2010 | Perez Rodriguez et al. | .. | 244/209 |
| 2004/0124311 A1 * | 7/2004 | Kordel et al. | .................. | 244/131 |

* cited by examiner

*Primary Examiner* — Tien Dinh
*Assistant Examiner* — Keith L Dixon
(74) *Attorney, Agent, or Firm* — Oblon, Spivak, McClelland, Maier & Neustadt, L.L.P.

(57) ABSTRACT

Joining structure for aircraft fairing (7), said fairing (7) being arranged between the horizontal stabilizer and the vertical stabilizer or fuselage section (6) of the aircraft, the structure comprising fittings (2) in the shape of angle, the fittings in turn comprising a vertical surface and a horizontal surface, the fittings (2) being joined via their vertical surface to the fairing (7) with removable fixing parts (12), the structure also comprising a deformable resilient element (13) between the fairing (7) and the vertical surface of the fitting (2), such that the resilient element (13) is able to compensate for the necessary deformation play and the manufacturing and assembly tolerances of the fittings (2), the fairing (7), the horizontal stabilizer and the vertical stabilizer or fuselage section (6) with different torques for tightening of the above parts.

11 Claims, 2 Drawing Sheets

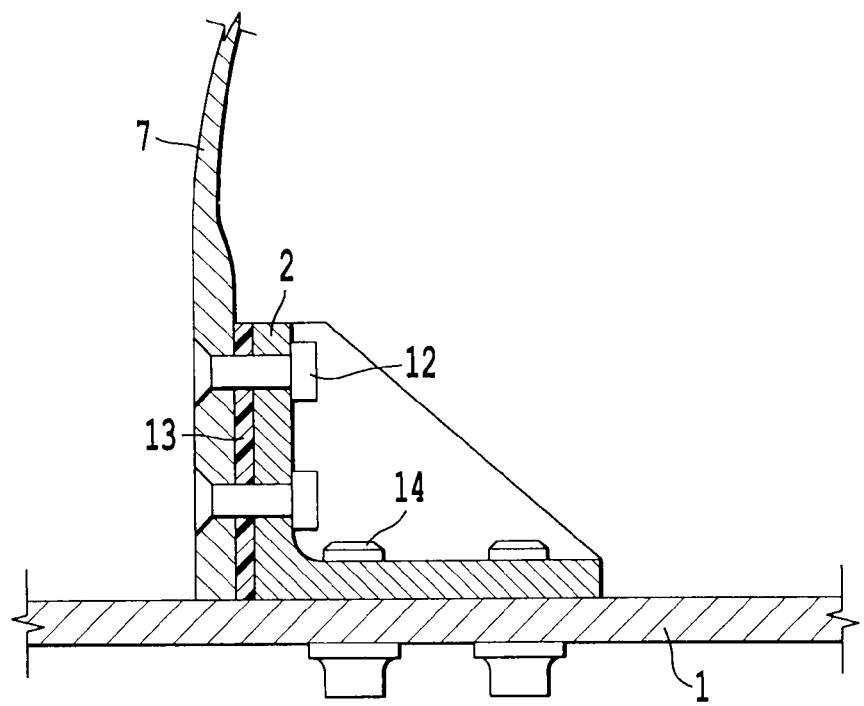
*Fig.3*
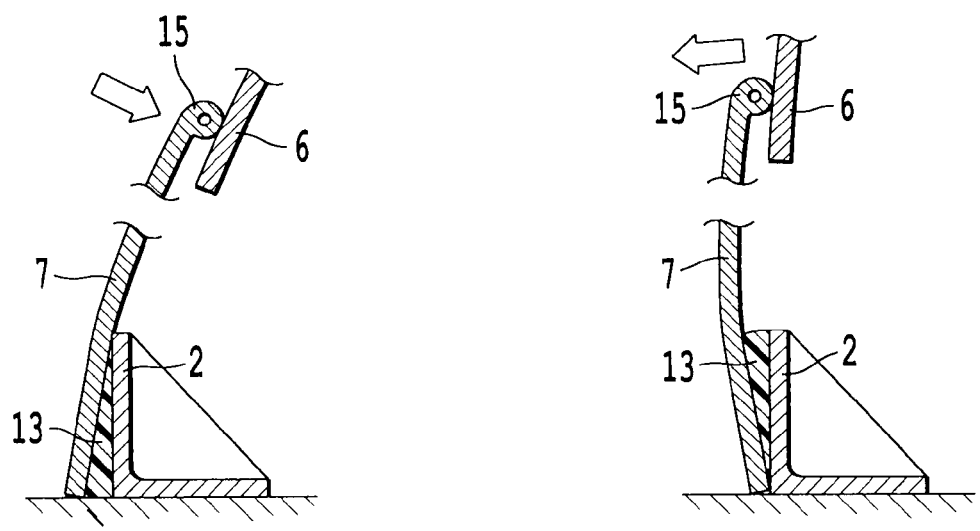
*Fig.4A*  *Fig.4B*

INTEGRATIVE STRUCTURE FOR AIRCRAFT FAIRING

FIELD OF THE INVENTION

The present invention relates to a joining structure for aircraft fairing, in particular a joining structure for aircraft fairing to be arranged between the horizontal stabilizer and the vertical stabilizer or fuselage section.

PRIOR ART

The main structural components of an aircraft are: the central fuselage, the engines, which provide the aircraft with the necessary thrust, the wing, which generates lift, and the horizontal stabilizer and the vertical stabilizer, which are used to control the aircraft. In order to minimize the aerodynamic impact of the external surfaces of the above main structural components, auxiliary surfaces are used to cover the parts for joining said main structures to the aircraft; at the same time these external surfaces ensure smoother cross-sectional profiles, thus reducing the aerodynamic resistance of said surfaces in the different flying positions. It must be taken into account, moreover, that, in the particular case of the horizontal stabilizer, this stabilizer, in most of aircraft, must be able to rotate on the axes of the aircraft.

Said external surfaces are commonly referred to by the name of "fairing", which fairing, since it consists of auxiliary structures, must be adapted to the primary structural components of the aircraft, including the possible variations in the final dimensions of said components, due to tolerances. Thus, in addition to the dynamic and static load requirements, the system for joining together the fairing and the primary structure must be adjustable.

Another of the requirements which the fairing must fulfill is that of interchangeability: since said fairing consists of auxiliary surfaces concealing important joints, it must be able to be removed during the typical aircraft maintenance operations, this being a critical requirement since handling of the fairing constantly affects the maintenance execution times.

Usually joining of the fairing between the vertical stabilizer or fuselage section and the horizontal stabilizer is performed by means of a system of separate metal fittings which are joined to the skin of the horizontal stabilizer. This joint comprises a serrated plate which is fixed to the skin of the horizontal stabilizer by means of special stud pins threaded on both sides and by means of removable fittings in the shape of angle which are serrated in the same direction as the plate and which reproduce the geometrical surface of the fairing. In turn, the fairing is fastened to the angular fittings by means of screws which are mated with self-mounting-nuts which are fixed to the fitting and allow assembly of the fairing on a single access side.

The conventional used joining system poses various problems. On the one hand, the additional weight of the different mechanical parts for joining and adjusting the fairing is considerable; on the other hand, such specific parts (with special serrations, for example) have a high cost; moreover the assembly and maintenance of the above fairing fixing system is very complex. Furthermore, the conventional used systems do not allow the adjustment of the top or bottom part of each associated fairing, which prevents advantageous correction of the tolerances arising during manufacture thereof (the fairing comprises top and bottom parts, respectively, in its joints with the top and bottom part of the fuselage, respectively).

The present invention offers a solution to the aforementioned problems.

SUMMARY OF THE INVENTION

Thus, the present invention refers to a joining structure for aircraft fairing, in particular a joining structure for aircraft fairing to be arranged between the horizontal stabilizer and the vertical stabilizer or fuselage section, such that said structure allows assembly of the fairing, reducing the number of mechanical parts for adjustment thereof and reducing considerably the weight of said integrative structure. Thus, in the fairing joining structure according to the invention, said fairing is joined rigidly to the horizontal stabilizer, resting in turn on the vertical stabilizer or fuselage section, its main function being that of minimizing the aerodynamic impact of the joint between both said surfaces.

According to the invention, the fairing joining structure, to be arranged between the horizontal stabilizer and the vertical stabilizer or fuselage section, comprises metal fittings in the shape of angle, said fittings comprising a vertical surface and a horizontal surface, on the axes of the aircraft, such that said fittings are joined, via the horizontal surface, by means of non-removable fixed joining parts to the skin of the horizontal stabilizer, said structure also comprising deformable resilient elements by means of which, and using fixing parts, the fairing is joined to the vertical surface of the above metal fittings.

The novel integrative fairing structure according to the invention solves the problem of adjusting the fairing without having to use serrated plates and without having to serrate the angular fittings, while maintaining the structural efficiency of the whole unit and simplifying the design, manufacture and assembly of the above components, resulting ultimately in cost-savings.

Further characteristic features and advantages of the present invention will emerge from the detailed description which follows of an example of embodiment of the subject thereof with reference to the accompanying figures.

DESCRIPTION OF THE FIGURES

FIG. 3 shows in schematic form a cross-section through the structure for joining the aircraft fairing to the horizontal stabilizer according to the invention, for a nominal assembly condition of said structure.

FIGS. 4a and 4b illustrate the possibility for relative adjustment of the top and bottom parts of the fairing using the fairing joining structure according to the invention, in particular assembly conditions of said structure.

DETAILED DESCRIPTION OF THE INVENTION

Figure 1:
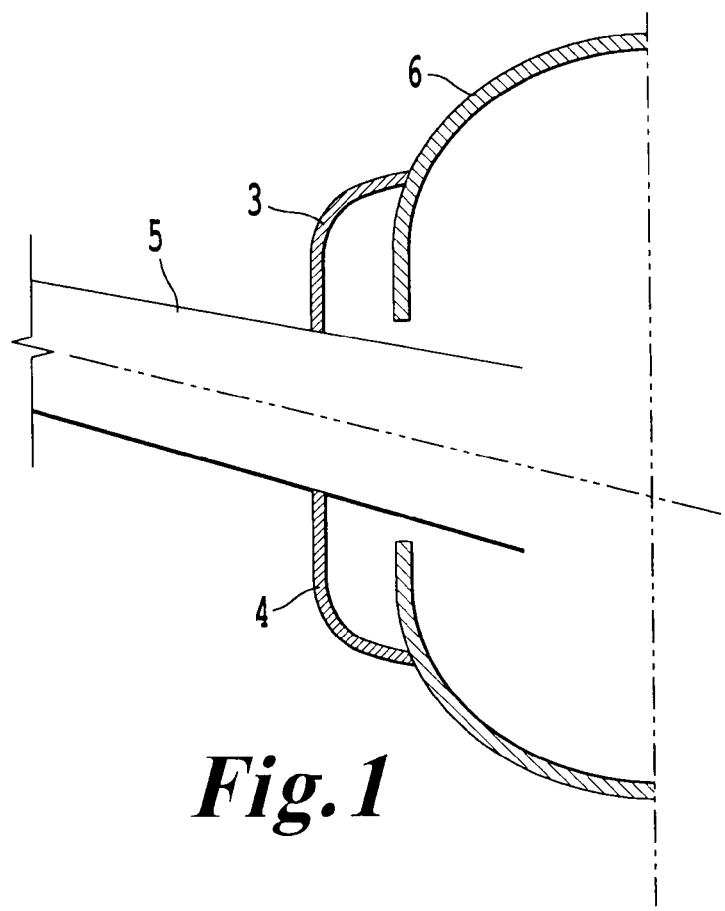
FIG. 1 shows in schematic form the typical location of the top and bottom fairing of an aircraft.

According to that shown in FIG. 1, the top and bottom fairing, 3 and 4, are joined on one side to the skin of the horizontal aerofoil 5 in question and, on the other side, to the fuselage or vertical aerofoil 6 of the aircraft.

Figure 2:
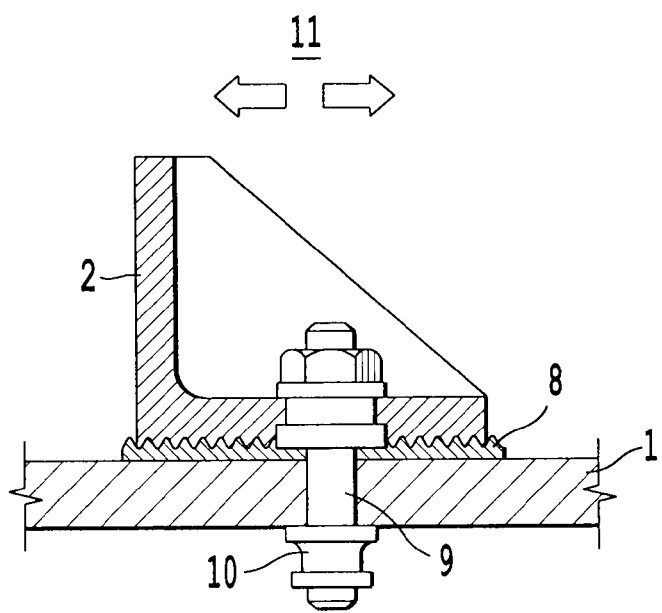
FIG. 2 shows in schematic form a cross-section through the structure for joining the aircraft fairing to the horizontal stabilizer, according to the known prior art.

According to the known art, as described in FIG. 2, joining of the fairing 7 (whether it be the top fairing 3 or bottom fairing 4) to the skin 1 of the horizontal stabilizer of an aircraft is performed by means of a system of separate metal fittings 2 which are joined to said skin 1 of the horizontal stabilizer.

Specifically, said joint comprises a serrated plate 8 (usually in the transverse direction of the aircraft) fixed to the skin 1 of the horizontal stabilizer by means of stud pins 9 and by means of fittings 2 in the shape of angle which are serrated in the same direction as the plate 8 and which reproduce the geometrical surface of the fairing 7. The fairing 7 is fixed to the fitting 2 by means of screwed joining members (not shown) which are joined to self-mounting nuts fixed to the fittings 2 and which allow assembly of the fairing 7 on a single access side.

As also shown in FIG. 2, the fittings 2 are joined integrally to the skin 1 of the horizontal stabilizer by means of a nut 10 and one of the sides of the stud pin 9. Owing to the intrinsic geometry of these stud pins 9, both the fitting 2 and the serrated plate 8 must comprise grooving to allow installation thereof. Said grooving is critical from the point of view of the size of the fitting 2.

The need for serrations in the plate 8 is due to the need for adjustment of the fairing 7 during joining thereof in the direction perpendicular to the serrations. In order to allow displacement of the fitting 2, the holes for joining said fitting 2 to the skin 1 of the horizontal stabilizer are oval-shaped in the direction perpendicular to the serrations. The remainder of the positioning tolerances along the two axes perpendicular to the displacement or adjusting movement 11 shown in FIG. 2 are compensated for by widening the diameter of the holes in the fitting in order to allow a small amount of play.

According to the invention, as can be seen in FIG. 3, the fairing 7 is joined to the fitting 2 by means of fixing parts 12, preferably screws, in the same way as in the conventional system, a resilient deformable element 13, in particular consisting of an elastomer material, being provided between the fairing 7 and the fitting 2. The resilient element 13 may remain resilient during the whole of its working life or harden after a suitable curing process following assembly thereof between the fairing 7 and the fitting 2, reducing to a minimum, in the latter case, the adjustments required following disassembly of the fairing 7 during removal for maintenance operations. In turn, the angular fitting 2 is joined to the skin 1 of the horizontal stabilizer by means of non-removable mechanical joining members 14, preferably riveted joining members.

Thus, the novel idea solves the problem of adjusting the fairing 7 without having to use serrated plates 8 and without having to serrate the fittings 2, while maintaining the structural efficiency of the whole unit and simplifying the design, manufacture and assembly of the components, resulting ultimately in cost-savings.

According to another aspect of the invention, it should be pointed out that the structure according to the invention provides a new possibility for relative adjustment of the top and bottom part of the fairing 7 (top fairing 3 and bottom fairing 4) and the vertical stabilizer or fuselage section 6 by means of the sealing profile 15. The small differences in deformation of the resilient element 13 during securing thereof to the fittings 2 are amplified in the sealing zone such that, approximately, a wedge of 1 mm in the support zone increases 4 mm to 200 mm and 10 mm to 500 mm, as shown in FIGS. 4a and 4b. This implies a reduction in the thickness of the resilient sealing element 13 necessary for joining together the fairing 7 and the surface of the vertical stabilizer or fuselage section 6.

To summarize, the system for adjusting the fairing joint according to the invention is shown in FIG. 3, illustrating a nominal condition, and in FIGS. 4a and 4b, illustrating particular assembly conditions resulting from different torques for tightening of the fixing parts 12 which join the fairing 7 to the fittings 2.

Moreover, owing to replacement of the serrated plate 8 by a resilient element 13 arranged between the fitting and the fairing 7, the joint between the fitting 2 and the skin 1 is performed according to the invention by means of blind rivets 14 without the need for intermediate parts (serrated plates 8) for the transmission of shearing loads to the skin 1. The stud pins 9 are special mechanical joining parts which are relatively more costly and more difficult to procure than blind rivets 14. Nevertheless, it may be convenient to use these stud pins 9 where there is good internal accessibility, for example in a fuel tank.

Another of the main advantages of the invention consists in the fact that simplification of the joining parts used, and replacement of the serrated plate 8 by a resilient element 13 between the fitting 2 and the fairing 7, result in a considerable reduction in weight.

On the other hand it is required to study the different torques for tightening of the fairing 7 and fittings 2 which allow the deformation play needed to compensate for the manufacturing and assembly tolerances of both parts, i.e. fittings 2 and fairing 7.

To summarize, costs, assembly time, maintenance and weight are reduced with the novel structure according to the invention.

The preferred embodiments described above may be subject to those modifications included within the scope defined by the following claims.

The invention claimed is:

1. A joining structure for a fairing of an aircraft, said fairing being arranged between a horizontal stabilizer and a vertical stabilizer or fuselage section of said aircraft, said structure comprising;
   a fitting that is in the shape of an angle, said fitting including a vertical surface and a horizontal surface, the fitting being joined via the vertical surface to the fairing by removable fixing parts; and
   a resilient element that is deformable and is located between the fairing and the vertical surface of the fitting, said resilient element being configured to compensate for manufacturing and assembly tolerances of the fitting, the fairing, the horizontal stabilizer, and the vertical stabilizer or fuselage section, by the resilient element being expandable or contractible in thickness from deformation of the resilient element to adjust a spacing between the fairing and the vertical surface of the fitting, the deformation resulting from torques that tighten the fitting, the fairing, the horizontal stabilizer, and the vertical stabilizer or fuselage section.

2. The joining structure for the fairing according to claim 1, wherein the joining structure is adjustable between a top part and a bottom part of the fairing, by amplifying differences in the deformation of the resilient element during securing of the resilient element to the fitting in a sealing zone, thus reducing a diameter of the resilient element required and facilitating considerably joining of the fairing, the resilient element, and the fitting.

3. The joining structure for the fairing according to either of the preceding claims, wherein the resilient element retains its resilience, allowing it to be joined between the fairing and the fitting independently of the aircraft assembled.

4. The joining structure for the fairing according to either of claims 1 to 2, wherein the resilient element is hardened after a suitable curing process, once assembly of said resilient element between the fairing and the fitting has been performed.

5. The joining structure for the fairing according to claim 1, wherein a joint between the fitting and a skin of the horizontal stabilizer is secured by blind rivets which transmit shearing loads from the fairing to said skin.

6. The joining structure for the fairing according to claim 1, wherein a joint between the fitting and a skin of the horizontal stabilizer is secured by stud pins where there is suitable internal accessibility to the skin of the horizontal stabilizer, in a fuel tank.

7. The joining structure for the fairing according to claim 1, wherein the fitting forms a right angle between the vertical surface and the horizontal surface.

8. The joining structure for the fairing according to claim 1, wherein the resilient element deforms so that a surface of the resilient element that is adjacent to the fairing forms an oblique angle relative to at least one of the vertical surface and the horizontal surface.

9. The joining structure for the fairing according to claim 1, wherein the resilient element deforms so that the spacing between the fairing and the vertical surface of the fitting is greater at a top part of the vertical surface of the fitting than at a bottom part of the vertical surface of the fitting.

10. The joining structure for the fairing according to claim 1, wherein the resilient element deforms so that the spacing between the fairing and the vertical surface of the fitting is greater at a bottom part of the vertical surface of the fitting than at a top part of the vertical surface of the fitting.

11. A joining structure for a fairing of an aircraft, said fairing being arranged between a horizontal stabilizer and a vertical stabilizer or fuselage section of said aircraft, said structure comprising:
  means for fitting, said fitting means being in the shape of an angle and including a vertical surface and a horizontal surface, the fitting means being joined via the vertical surface to the fairing by removable fixing parts; and
  means for deforming, said deforming means being resilient and being located between the fairing and the vertical surface of the fitting means, and said deforming means being configured to compensate for manufacturing and assembly tolerances of the fitting means, the fairing, the horizontal stabilizer, and the vertical stabilizer or fuselage section, by the deforming means being expandable or contractible in thickness from deformation of the deforming means to adjust a spacing between the fairing and the vertical surface of the fitting, the deformation resulting from torques that tighten the fitting means, the fairing, the horizontal stabilizer, and the vertical stabilizer or fuselage section.

* * * * *